United States Patent
Bressler (10) Patent No.: US 10,995,276 B2
(45) Date of Patent: May 4, 2021

(54) METHODS FOR PRODUCING HYDROCARBON COMPOSITIONS WITH REDUCED ACID NUMBER AND FOR ISOLATING SHORT CHAIN FATTY ACIDS

(71) Applicant: FORGE HYDROCARBONS CORPORATION, Oakville (CA)

(72) Inventor: David Bressler, St. Albert (CA)

(73) Assignee: Forge Hydrocarbons Corporation, Oakville (CA)

( * ) Notice: Subject to any disclaimer, the term of this patent is extended or adjusted under 35 U.S.C. 154(b) by 0 days.

(21) Appl. No.: 16/320,230

(22) PCT Filed: Jul. 21, 2017

(86) PCT No.: PCT/IB2017/001072
§ 371 (c)(1),
(2) Date: Jan. 24, 2019

(87) PCT Pub. No.: WO2018/020321
PCT Pub. Date: Feb. 1, 2018

(65) Prior Publication Data
US 2019/0233735 A1   Aug. 1, 2019

Related U.S. Application Data

(60) Provisional application No. 62/366,278, filed on Jul. 25, 2016.

(51) Int. Cl.
| | | |
|---|---|---|
| *C10G 3/00* | (2006.01) | |
| *C10G 25/02* | (2006.01) | |
| *C10G 25/00* | (2006.01) | |
| *C10G 19/02* | (2006.01) | |
| *C10G 19/00* | (2006.01) | |

(52) U.S. Cl.
CPC ............... *C10G 3/40* (2013.01); *C10G 3/00* (2013.01); *C10G 19/00* (2013.01); *C10G 19/02* (2013.01); *C10G 25/00* (2013.01); *C10G 25/02* (2013.01); *C10G 2300/1003* (2013.01); *C10G 2300/1014* (2013.01); *C10G 2300/1018* (2013.01); *Y02P 30/20* (2015.11)

(58) Field of Classification Search
CPC .......... C10G 3/00; C10G 3/40; C10G 25/00; C10G 19/02; C10G 25/02; C10G 2300/1003; C10G 2300/1014; Y02P 30/20
USPC ................. 585/240, 241, 242, 823, 824, 854
See application file for complete search history.

(56) References Cited

U.S. PATENT DOCUMENTS

| | | |
|---|---|---|
| 2,053,845 A | 8/1936 | Otto et al. |
| 2,437,438 A | 9/1948 | Petroff et al. |
| 2,516,112 A | 7/1950 | Freiman |
| 2,660,601 A | 11/1953 | Dickinson |
| 2,836,601 A | 5/1958 | Godfrey et al. |
| 3,872,142 A | 3/1975 | Saito et al. |
| 4,235,702 A | 11/1980 | Smith |
| 4,395,324 A | 7/1983 | Derbyshire et al. |
| 4,554,397 A | 11/1985 | Stern et al. |
| 4,992,605 A | 12/1991 | Craig et al. |
| 5,225,580 A | 6/1993 | Zinnen |
| 5,578,090 A | 11/1996 | Bradin |
| 5,705,722 A | 6/1998 | Monnier et al. |
| 5,917,068 A | 6/1999 | Barnicki et al. |
| 7,491,858 B2 | 2/2009 | Murzin et al. |
| 8,067,653 B2 | 11/2011 | Bressler |
| 8,202,413 B2 | 6/2012 | Joensen et al. |
| 8,920,632 B2 | 12/2014 | Feugnet et al. |
| 8,975,457 B2 | 3/2015 | Bressler |
| 9,238,779 B2 | 1/2016 | Gosselink |
| 2003/0089027 A1 | 5/2003 | Jordan |
| 2003/0089028 A1 | 5/2003 | Jordan |
| 2004/0230085 A1 | 8/2004 | Jakkula et al. |
| 2006/0199988 A1 | 7/2006 | Kowalik |
| 2007/0068848 A1 | 3/2007 | Monnier et al. |
| 2007/0135316 A1 | 6/2007 | Koivusalmi et al. |
| 2007/0277429 A1 | 6/2007 | Jackam et al. |
| 2008/0034645 A1 | 2/2008 | Bressler |
| 2008/0241339 A1 | 2/2008 | Mitchell |
| 2008/0193351 A9 | 8/2008 | Boardman |
| 2008/0229654 A1 | 9/2008 | Bradin |
| 2008/0305531 A1 | 11/2008 | Lam et al. |
| 2009/0182166 A1 | 7/2009 | Kubatova et al. |
| 2009/0259082 A1 | 10/2009 | Deluga et al. |
| 2009/0069610 A1 | 12/2009 | Roberts et al. |
| 2010/0160506 A1 | 6/2010 | Wu |

(Continued)

FOREIGN PATENT DOCUMENTS

| | | |
|---|---|---|
| CN | 101914413 A | 12/2010 |
| CS | 275924 | 3/1992 |

(Continued)

OTHER PUBLICATIONS

Snare et al., "Heterogeneous catalytic deoxygenation of stearic acid for production of biodiesel," Ind. Eng. Chem. Res., 2006, 45:5708-5715.

Srivastava et al., "Triglycerides-based diesel fuels," Renewable and Sustainable Energy Rev., 2000, 4:111-133.

(Continued)

*Primary Examiner* — Thuan D Dang
(74) *Attorney, Agent, or Firm* — Ridout & Maybee LLP (57) ABSTRACT

The methods described herein provide an efficient way to remove and isolate short chain fatty acids from hydrocarbons that are produced upon the heating of a fatty acid resource. The short chain fatty acids can be continuously isolated and fed into the pyrolysis reactor, which in turn increases the overall efficiency of the production of the hydrocarbons. Alternatively, the short chain fatty acids can be isolated and used in other applications.

30 Claims, 5 Drawing Sheets

(56) References Cited

U.S. PATENT DOCUMENTS

| | | |
|---|---|---|
| 2010/0185021 A1 | 7/2010 | Ross et al. |
| 2010/0296997 A1 | 11/2010 | Parker et al. |
| 2011/0139596 A1 | 6/2011 | Bartek |
| 2011/0184215 A1 | 7/2011 | Jess |
| 2011/0232161 A1 | 9/2011 | Siskin |
| 2011/0272326 A1 | 10/2011 | Feugnet |
| 2012/0136185 A1 | 5/2012 | Bressler |
| 2012/0172622 A1 | 5/2012 | Kocal |
| 2012/0203042 A1 | 9/2012 | Huber |
| 2012/0289729 A1 | 11/2012 | Holtcamp |
| 2012/0316370 A1 | 12/2012 | Bressler |
| 2014/0148624 A1 | 5/2014 | Ohler |
| 2014/0155669 A1 | 6/2014 | Slowing et al. |
| 2015/0025285 A1 | 1/2015 | Cleverdon et al. |
| 2015/0328562 A1 | 11/2015 | Chapman et al. |
| 2016/0024394 A1 | 1/2016 | Bressler |

FOREIGN PATENT DOCUMENTS

| | | |
|---|---|---|
| GB | 175974 | 6/1923 |
| GB | 218278 | 4/1925 |
| JP | S6397696 | 4/1988 |
| JP | 2012188577 | 10/2012 |
| RU | 2009105075 | 8/2010 |
| WO | 1997045197 | 4/1997 |
| WO | 2004035714 | 4/2004 |
| WO | 2007027669 | 3/2007 |
| WO | 2007068798 | 6/2007 |
| WO | 2007068880 | 6/2007 |
| WO | 2007027955 | 8/2007 |
| WO | 2008029301 | 3/2008 |
| WO | 2008103204 | 8/2008 |
| WO | 2009047793 | 4/2009 |
| WO | 2010132123 | 11/2010 |
| WO | 2011007046 | 1/2011 |
| WO | 20111104626 A2 | 9/2011 |
| WO | 2014181192 | 11/2014 |

OTHER PUBLICATIONS

Tanabe et al., "Role of fine solids in the coking of vacuum residues," Energy and Fuels, 1997, 11:1040-1043.
Tat et al., "Biodiesel Blend Detection with a Fuel Composition Sensor," Applied Eng. in Agriculture, 2003, 19:125-131.
Tat et al., "The kinematic viscosity of biodiesel and its blends with diesel fuel," J. Am. Oil Chem. Soc., 1999, 76:1511-1513.
Tat et al., "The specific gravity of biodiesel and its blends with diesel fuel," J. Am, Oil Chem. Soc., 2000, 77:115-119.
Watanabe et al., "Decomposition of a Long Chain Saturated Fatty Acid with Some Additives in Hot Compressed Water," Energy Conversion and Management, 2006, 47:3344-3350.
Zhang et al,, "Catalytic Decarboxylation of Fatty Acids by Iron-Containing Minerals in Immature Oil Source Rocks at Low Temperature," Chinese Sci. Bulletin, 1999, 44:1523-1527.
Zhe et al., "Catalytic decarboxylations of fatty acids in immature oil source rocks," Science in China, 2003, 46:1250-1260.
Alencar, "Pyrolysis of tropical vegetable oils," J. Agric. Food Chem., 1983, 31:1268-1270.
Australian Examination Report No. 1 for AU 2014264339 dated Feb. 5, 2018, 3pp.
Australian Examination Report No. 2 for AU 2014264339 dated Feb. 20, 2018, 4pp.
Bressler et al., "Hydrotreating chemistry of model products from bioprocessing of carbazoles," Energy and Fuels, 2002, 16:1076-1086.
Bridgwater et al., "Fast pyrolysis processes for biomass," Renewable and Sustainable Energy Rev., 2000, 4:1-73.
Chinese First Office Action for 201480021976.5 dated Jun. 27, 2016, 11pp., English translation.
Demirbas, A. "Biodiesel fuels from vegetable oils via catalytic and non-catalytic supercritical alcohol transesterifications and other methods: a survey," Energy Conversion and Management, 2003, 44:2093-2109.
Demirbas, A., "Diesel fuel from vegetable oil via transesterification and soap pyrolysis," Energy Sources, 2002, 24:835-841.
Erclyes et al., "The decomposition of secondary esters of castor oil with fatty acids," J. Am. Oil Chem. Soc., 1991, 68:642-645.
European Office Action for 14795176.8 dated Feb. 25, 2016, 5pp.
European Patent Office Official Communication for 14795176.8 dated Nov. 17, 2016, 5pp.
Serguchev et al., "Oxidate decarboxylation of carboxylic acids," Russian Chem. Rev., 1980, 49:1119-1134.
European Search Report for 07849051.3 dated Jul. 22, 2011, 8pp.
European Search Report for 14795176.8 dated Feb. 5, 2016, 4pp.
Foglia et al., "Decarbonylation Dehydration of Fatty Acids to Alkenes in the Presence of Transition Metal Complexes," J. Am. Oil. Chem. Society, 1976, 53:737-741.
Graboski et al., "Combustion of fat and vegetable oil derived fuels in diesel engines," Prog. Energy Combust. Sci., 1998, 24:125-164.
International Association for Cannabis as Medicine (IACM), "Definitions and Explanations," 2002, 3pp., http://www.cannabis-med.org/science/science-definitions.htm>, accessed Jun. 25, 2018.
International Preliminary Report on Patentability for PCT/IB14/01595 dated Aug. 20, 2015, 12pp.
International Search Report and Written Opinion for PCT/IB07/04187 dated Aug. 27, 2008, 7pp., issued by USPTO.
International Search Report and Written Opinion for PCT/IB07/04187 dated Sep. 4, 2008, 13pp., issued by Canadian Intellectual Property Office.
International Search Report and Written Opinion for PCT/IB11/00464 dated Sep. 6, 2011, 9pp.
International Search Report and Written Opinion for PCT/IB14/01595 dated Dec. 1, 2014, 14pp.
Japanese Office Action for JP 2015-562423 dated Jan. 17, 2018, 2pp., English translation.
Jaw, "The Thermal Decomposition Behaviors of Stearic Acid, Paraffin Wax, and Polyvinyl Butyral," Thermochimica Acta, 2001, 367-368:1268-1270.
Jindarom, C. et al., "Thermochemical decomposition of sewage sludge in CO2 and N2 atmosphere," Chemosphere, 2007, 67:1477-1484.
Karaosmanoglu et al., "Biofuel production using slow pyrolysis of the straw and stalk of the rapeseed plant," Fuel Processing Tech., 1999, 59:1-12.
Kubickova et al., "Hydrocarbons for diesel fuel via decarboxylation of vegetable oils," Catalysis Today, 2005, 106:197-200.
Maher et al., "Pyrolysis of triglyceride materials for the production of renewable fuels and chemicals," Bioresource Tech., 2007, 98:2351-2368.
Maier et al., "Gas Phase Decarboxylation of Carboxylic Acids," Chem. Ber., 1982, 115:808-812.
Meng, X. et al., "Catalytic and thermal pyrolysis of atmospheric residue," Energy and Fuels, 2009, 23:65-69.
Moquin et al., "Kinetic modeling of glycerolysis-hydrolysis of canola oil in supercritical carbon dioxide media using equilibrium data," J. Supercritical Fluids, 2006, 37:417-424.
Office Action for U.S. Appl. No. 11/776,047 dated Mar. 24, 2011, 11pp.
Office Action for U.S. Appl. No. 11/776,047 dated May 27, 2010, 10pp.
Office Action for U.S. Appl. No. 11/776,047 dated Oct. 6, 2010, 15pp.
Office Action for U.S. Appl. No. 11/776,047 dated Oct. 7, 2009, 8pp.
Office Action for U.S. Appl. No. 13/580,994 dated Mar. 27, 2014, 8pp.
Office Action for U.S. Appl. No. 14/775,949 dated Feb. 14, 2018, 15pp.
Office Action for U.S. Appl. No. 14/775,949 dated Jun. 29, 2018, 17pp.
Office Action for 14/775,949 dated Jun. 5, 2017, 15pp.
Office Action for Ukrainian Application No. 200901198 dated Mar. 14, 2011, 2pp., English translation.
Office Action for Ukrainian Application No. 200901198 dated Nov. 8, 2010, 2pp., English translation.

(56) References Cited

OTHER PUBLICATIONS

Official Action for Indian Application No. 2754/MUMNP/2015 dated Nov. 16, 2018, 6pp.
Official Action for Russian Application No. 2009105075/04 dated Jun. 30, 2011, 1pp., English translation.
Official Action for Ukrainian Application No. a 2015 10018 (original with English translation) dated Jul. 6, 2018, 13pp.
Othmer, K. "Carboxylic Acid (Manufacture)," Encyclopedia of Chemical Technology, Dec. 31, 1978, p. 835-844.
Piskorz et al., "Flash pyrolysis of cellulose for production of anhydro-oligomers," J. Anal. App. Pyrolysis, 2000, 56:145-166.
Predel et al., "Pyrolysis of rape-seed in a fluidised-bed reactor," Bioresource Tech., 1998, 66:113-117.
Russian Office Action for RU 2015143826/04(067578) dated Feb. 12, 2018, 11pp., English translation.
Sensoz et al., "Influence of particle size on the pyrolysis of rapeseed (Brassica napus L.): fuel properties of bio-oil," Biomass and Bioenergy, 2000, 19:271-279.
Extended European Search Report; EP 17833641.8 dated Jan. 21, 2020.
Office Action; Indian Application No. 201927006209 dated Oct. 19, 2020.
Office Action and English Translation thereof; CN Application No. 201780058399 dated Nov. 13, 2020.
Cheremichkina I.A. Organic Chemistry 10-11 class, p. 14 http://lyceum.urfu.ru/fileadmin/user_upload/uchebnik_organicheskaja_khimija_iach_afg.pdf 2012.
B.F. Petrov "Flotation reagent from fatty wastes of fish processing enterprises" Food processing industry 2, pp. 53-58 2011.
Office Action and English Translation; RU Application No. 2019104895 dated Nov. 9, 2020.
Notice of Rejection for Japanese Patent Application 2019-504067, dated Feb. 1, 2021.

FIG. 5 ated from the pyrolysis product stream and subsequently
METHODS FOR PRODUCING HYDROCARBON COMPOSITIONS WITH REDUCED ACID NUMBER AND FOR ISOLATING SHORT CHAIN FATTY ACIDS

CROSS REFERENCE TO RELATED APPLICATIONS

This application claims priority upon U.S. provisional application Ser. No. 62/366,278, filed Jul. 25, 2016. This application is hereby incorporated by reference in its entirety for all of its teachings.

SUMMARY

The methods described herein provide an efficient way to remove and isolate short chain fatty acids from hydrocarbons that are produced upon the heating of a fatty acid resource. The short chain fatty acids can be continuously isolated and fed into the pyrolysis reactor, which in turn increases the overall efficiency of the production of the hydrocarbons. Alternatively, the short chain fatty acids can be isolated and used in other applications.

The advantages of the materials, methods, and articles described herein will be set forth-in part in the description which follows, or may be learned by practice of the aspects described below. The advantages described below will be realized and attained by means of the elements and combinations particularly pointed out in the appended claims. It is to be understood that both the foregoing general description and the following detailed description are exemplary and explanatory only and are not restrictive.

BRIEF DESCRIPTION OF FIGURES

The accompanying Figures, which are incorporated in and constitute a part of this specification, illustrate several aspects described below.

DETAILED DESCRIPTION

Before the present materials, articles, and/or methods are disclosed and described, it is to be understood that the aspects described below are not limited to specific compounds, synthetic methods, or uses as such may, of course, vary. It is also to be understood that the terminology used herein is for the purpose of describing particular aspects only and is not intended to be limiting.

In this specification and in the claims that follow, reference will be made to a number of terms that shall be defined to have the following meanings:

It must be noted that, as used in the specification and the appended claims, the singular forms "a," "an" and "the" include plural referents unless the context clearly dictates otherwise. Thus, for example, reference to "a hydrocarbon" includes a hydrocarbon or mixtures of two or more hydrocarbons.

"Optional" or "optionally" means that the subsequently described event or circumstance can or cannot occur, and that the description includes instances where the event or circumstance occurs and instances where it does not.

"Hydrocarbons" as used herein are branched, cyclic, or straight chain alkanes or alkenes. The hydrocarbons in general have a carbon length that is less than the carbon length of the fatty acid resource. The hydrocarbons produced herein have numerous uses including, but not limited to fuels (e.g., biofuels, jet fuels, diesel, and gasoline), solvents, and diluents.

Throughout this specification, unless the context dictates otherwise, the word "comprise," or variations such as "comprises" or "comprising," will be understood to imply the inclusion of a stated integer or step or group of integers or steps but not the exclusion of any other integer or step or group of integers or steps. It is also contemplated that the term "comprises" and variations thereof can be replaced with other transitional phrases such as "consisting of" and "consisting essentially of."

In one aspect, described herein are methods for producing hydrocarbons with a reduced acid number. In this aspect, the method involves the method comprising
(a) heating a fatty acid resource to produce a first composition comprising the hydrocarbons and at least one short chain free fatty acid; and
(b) removing the short chain free fatty acid from the first composition to produce a final hydrocarbon composition having an acid number less than 0.1 as measured by ASTM D974.

The components and conditions for each step are discussed in detail below.

The term "fatty acid resource" as defined herein is any source of fatty acid. The fatty acid can include the free fatty acid or the corresponding salt thereof. The term "free fatty acid" is referred to herein as the acid form of the fatty acid (i.e., terminal —COOH group) and not the corresponding salt. Alternatively, the fatty acid resource can include precursors to fatty acids. For example, the fatty acid precursor can be a lipid, a triglyceride, a diglyceride or a monoglyceride.

Examples of fatty acid resources include, but are not limited to, vegetable and plant oils, animal fats, algal or fungal oils, tall oils, animal fats, lipids derived from biosolids, spent cooking oil, lipids, phospholipids, soapstock, or other sources of triglycerides, diglycerides or monoglycerides. In one aspect, the vegetable oil comprises corn oil, cottonseed oil, canola oil, rapeseed oil, olive oil, palm oil, peanut oil, ground nut oil, safflower oil, sesame oil, soybean oil, sunflower oil, algae oil, almond oil, apricot oil, argan oil, avocado oil, ben oil, cashew oil, castor oil, grape seed oil, hazelnut oil, hemp seed oil, linseed oil, mustard oil neem oil, palm kernel oil, pumpkin seed oil, tall oil, rice bran oil, walnut oil, a combination thereof. In another aspect, the animal fat comprises blubber, cod liver oil, ghee, lard, tallow, derivatives thereof (e.g., yellow grease, used cooking oil, etc.), or a combination thereof.

It is contemplated that the fatty acid resource can be further purified prior to subsequent processing. For example, the fatty acid resource can be distilled or extracted to remove any undesirable impurities. In the alternative, the fatty acid resource can be used as-is. The source of the fatty acid resource will determine if any pre-purification steps are required. The fatty acid resource can subsequently be pyrolyzed in the presence of an alkene using the techniques described below.

In certain aspects, the fatty acid resource can be further processed prior to pyrolysis in order to convert certain components present in the fatty acid resource into other species. In one aspect, separation step (a) involves removing or isolating one or more free fatty acids from the fatty acid resource. A number of different techniques are known in the art for the isolation and purification of fatty acids. For example, U.S. Pat. No. 5,917,501 discloses a process for isolating fatty acids. The process involves hydrolyzing a naturally occurring lipid mixture containing phospholipids, triglycerides, and sterols to form a two-phase product containing a free fatty acid phase comprised of fatty acids and sterols, and an aqueous phase comprised of water, glycerol, and glycerol phosphoric acid esters. The aqueous phase is separated from the fatty acid phase and the crude fatty acid phase is heated to convert the free sterols to fatty acid sterol esters. The free fatty acids are distilled from the fatty acid sterol esters to yield purified free fatty acids, which are free of cholesterol and other sterols, and phosphorous compounds. In other aspects, the fatty acid resource is exposed to acid in order to hydrolyze a fatty acid precursor present in the fatty acid resource to produce the corresponding free fatty acid. For example, vegetable oils are rich in triglycerides, which upon acid hydrolysis, produce the free fatty acid and glycerol.

In certain aspects, after the separation step, it can be desirable to produce a pure or substantially pure form of the fatty acid. The phrase "substantially pure" as used herein is defined as greater than 80%, greater than 85%, or greater than 90% by weight fatty acid content. The presence of impurities can adversely affect the final composition of the hydrocarbon solvent. For example, if sulfur, oxygen, or nitrogen compounds are present in the fatty acid prior to step (b), undesirable product characteristics result including high sulfur or nitrogen emissions during combustion or side-reactions may occur during step (b) such as the formation of undesirable aromatic compounds.

The nature of the fatty acid will vary depending upon the fatty acid resource. The fatty acid can be a saturated fatty acid, an unsaturated fatty acid, or a combination thereof. Examples of fatty acids include, but are not limited to, butyric acid, lauric acid, myristic acid, palmitic acid, stearic acid, arachidic acid, alpha-linolenic acid, docosahexaenoic acid, eicosapentaenoic acid, linoleic acid, arachidonic acid, oleic acid, erucic acid, a naturally derived fatty acid from a plant or animal source, or a combination thereof. The fatty acid can also be a mixture of free fatty acids.

The temperature of the heating step (a) can vary amongst different parameters. In one aspect, the temperature of the heating step is from 220° C. to 650° C., 300° C. to 650° C., 350° C. to 650° C., 350° C. to 600° C., 250° C. to 500° C., 350° C. to 450° C., 380° C. to 450° C., 390° C. to 450° C., 390° C. to 430° C., or 390° C. to 420° C. Other parameters to consider are the duration of the heating step and the pressure at which the heating step is conducted. The pressure can range from ambient to 2,000 psi, and the duration of the heating step can be from seconds up to 12 hours. In one aspect, the heating step is from two seconds up to 8 hours.

By varying reaction conditions during the conversion of the fatty acid resource to hydrocarbons in step (a), one of ordinary skill in the art can produce short or long chain alkanes/alkenes. For example, prolonged heating at elevated temperatures can produce short chain alkanes/alkenes that can be useful as fuels. Alternatively, long chain alkanes/alkenes can be produced by one of ordinary skill in the art by reducing the heating time and temperature. If short chain alkanes or alkenes are produced, reaction conditions can be controlled such that these products are gasses (e.g., methane, propane, butane, etc.) that can be readily removed from the reactor.

In one aspect, the heating step (a) is performed under an inert atmosphere such as, for example, nitrogen or argon. In another aspect, no component is added to the reactor prior to or during the heating step (a) that would react with the chemical species produced during heating step (a). For example, in this aspect, hydrogen is not introduced into the reactor to conduct a hydrogenation step, which is a technique known in the art. In other aspects, depending upon the selection of the fatty acid resource and conditions in the reactor, reactive compounds such as hydrogen can be produced in situ.

In another aspect, an alkene is introduced into the pyrolysis reactor in heating step (a) in order to produce branched alkanes and alkenes. The term "alkene" is an organic molecule having one carbon-carbon double bond. In one aspect, the alkene is a linear or branched molecule composed solely of carbon and hydrogen. The alkene can be gas or liquid at ambient temperature. In another aspect, the alkene is ethylene, propylene, butene or isomers thereof (e.g., isobutene) or a mixture thereof.

The amount of alkene that is introduced into the pyrolysis reactor can vary. In certain aspects, a molar excess of alkene relative to the fatty acid resource can be employed. For example, the molar ratio of fatty acid resource to alkene is from 1:1 to 1:5, 1:1 to 1:4, 1:1 to 1:3, or 1:1 to 1:2, where the moles of gas are calculated using van der Waal's equation of state for real gases. In other aspects, there can be a substantially higher amount of the source of the fatty acid resource relative to alkene. Thus, depending upon process conditions and reaction kinetics, the relative amount of alkene and source of the fatty acid resource can be modified accordingly.

In fuel formulations, branched-chain alkanes and alkenes are preferred because they are less prone to the phenomenon of knocking (due to their high octane number) compared with their straight-chain homologues. In addition, branched alkanes and alkenes find widespread industrial applications as solvents for nonpolar chemical species. Straight-chain alkanes and alkenes are conventionally converted to branched isomers in industrial processes such as reforming and isomerization in presence of metal catalysts.

In another aspect, the use of a decarboxylation catalyst can be used in heating step (a) to facilitate the conversion of the fatty acid resource to the hydrocarbons. Depending upon the selection of the decarboxylation catalyst, the catalyst can reduce the heating temperature and time. This is desirable in certain instances, particularly if degradation of the alkane/alkene or side reactions (e.g., aromatization) is to be avoided. Examples of decarboxylation catalysts include, but are not limited to, activated alumina catalysts. The use of the decarboxylation catalyst is optional; thus, the methods described herein do not require the presence of a decarboxylation catalyst.

After the fatty acid resource has been converted to one or more hydrocarbons after heating step (a), the hydrocarbons will also include varying amounts of free short chain fatty acids. The term "free short chain fatty acids" as used herein are fatty acids having a chain length smaller than fatty acid resource used as the starting material. For example, if the fatty acid resource includes a C18 fatty acid, the short chain free fatty acid would be a C5 to C17 fatty acid.

In order to increase the purity of the hydrocarbons produced herein as well as the overall efficiency of the process, the short chain free fatty acids are separated from the hydrocarbons.

In one aspect, the short chain free fatty acids are separated from the hydrocarbon composition by contacting the hydrocarbon composition with an adsorbent. In one aspect, the adsorbent can be silica. For example, the silica can be activated (e.g., treated with acid). In other aspects, the silica can be modified silica, which is silica that has been chemically derivatized. For example, the silica can be derivatized with primary and secondary amine groups. In one aspect, the silica or modified silica has a particle diameter from 40 to 70 μm and a pore size of 10 Å to 100 Å. In one aspect, the silica or modified silica has a particle diameter 40 μm, 45 μm, 50 μm, 55 μm, 60 μm, 65 μm, or 70 μm and a pore size of 10 Å, 20 Å, 30 Å, 40 Å, 50 Å, 60 Å, 70 Å, 80 Å, 90 Å, or 100 Å, where any value can be a lower and upper end-point of a range (e.g., 40 μm to 60 μm pore diameter, 50 Å to 70 Å pore size). In one aspect, the adsorbent can be in a column or a series of columns. The amount of adsorbent and the number of columns used can vary depending upon the scale of the removal of the short chain free fatty acids.

After the short chain free fatty acids have been removed from the hydrocarbon composition by an adsorbent, it is desirable to remove the short chain free fatty acids from the adsorbent. First, it is desirable to remove the short chain free fatty acids from the adsorbent in order to regenerate the adsorbent for future use. Second, the short chain free fatty acids are valuable components in themselves. Finally, as will be discussed in greater detail below, the short chain free fatty acids can be recycled through the process described herein to increase the production of hydrocarbons.

In one aspect, the short chain free fatty acids can be removed from the adsorbent by contacting the adsorbent with a polar solvent. For example, the solvent can be an alcohol such as methanol, ethanol, propanol, and the like. In another aspect, the polar solvent can be an aprotic solvent such a nitrile (e.g., acetonitrile), an ether (e.g., dimethyl ether), an ester, or a chlorohydrocarbon (e.g., dimethylene chloride). In another aspect, the short chain free fatty acids can be removed from the adsorbent by contacting the adsorbent with supercritical carbon dioxide fluid to remove the short chain free fatty acid from the adsorbent. Each of these embodiments for removing the short chain free fatty acids from the adsorbent is described in further detail in the Examples.

In another aspect, the short chain free fatty acids can be removed from the adsorbent by contacting the adsorbent with a supercritical fluid product, wherein the supercritical fluid product is a byproduct from step (a). Not wishing to be bound by theory, during heating step (a) when the fatty acid resource is converted to hydrocarbons, byproducts including, but not limited to, carbon monoxide, carbon dioxide, methane, ethane, hydrogen, or any combination thereof can also be produced. These byproducts can be removed from the headspace of the reactor, heated and compressed to a supercritical fluid product containing one or more of the byproducts, and introduced into the column containing the adsorbent in order to remove the short chain free fatty acids from the adsorbent.

In one aspect, the following process is conducted in a continuous process:
(a) heating a free fatty acid in a reactor to produce a first composition comprising the hydrocarbons and at least one short chain free fatty acid;
(b) introducing the first composition into a column comprising an adsorbent, wherein the short chain free fatty acid is removed from the first composition to produce a final hydrocarbon composition having an acid number less than 0.02 as measured by ASTM D974;
(c) removing the short chain free fatty acid from the adsorbent; and
(d) introducing the short chain free fatty acid into the reactor of step (a) and heating the short chain free fatty acid to produce a second hydrocarbon composition and at least one second short chain free fatty acid, wherein steps (a) to (d) are performed continuously.

In another aspect, the short chain free fatty acids are separated from the hydrocarbon composition by contacting the hydrocarbon composition with a base. In one aspect, the hydrocarbon composition is admixed with an aqueous base to produce an aqueous phase and hydrocarbon phase, where the aqueous phase includes the corresponding salt of the short chain free fatty acids. The Examples provide exemplary methods for removing short chain free fatty acids from hydrocarbon compositions via base extraction.

The selection of the base can vary. In one aspect, the base is an alkali metal hydroxide, an alkali metal carbonate, an alkaline earth metal hydroxide, or an alkaline earth metal carbonate, or any combination thereof. In another aspect, the base is sodium hydroxide or potassium hydroxide. The amount of base can also vary. In general, the amount of base is sufficient to deprotonate all of the carboxylic acid groups present in the short chain fatty acid. In one aspect, the molar amount of base is greater than or equal to the molar equivalent of carboxylic acid groups present in the fatty acid.

In another aspect, the short chain free fatty acids are separated from the hydrocarbon composition by contacting the hydrocarbon composition with an anion exchange resin. An anion exchange resin refers to a synthetic resin that exchanges its own anions with other anions in a solution. The anion exchange column can adsorb the short chain fatty acid. The anion exchange resins may be either strongly or weakly basic. Strongly basic anion resins maintain their positive charge across a wide pH range, whereas weakly basic anion resins are neutralized at higher pH levels.

In one aspect, the anion exchange resin is a mixture of a polymer and a compound with a plurality of amino groups (primary, secondary, tertiary). In another aspect, the anion exchange resin is polystyrene and a polymer with a plurality of amino groups (e.g., polyethylene amine, polyethyleneimine, etc.). A non-limiting example of an anion exchange resin useful herein is AMBERLYST® A21 manufactured The Dow Chemical Company. The Examples provide exemplary methods for removing short chain free fatty acids from hydrocarbon compositions using anion exchange resins.

The methods described herein can be performed in batch, semi-batch, or continuous modes of operation. In this embodiment, each step is performed continuously, where the short chain fatty acids are separated from the hydrocarbons and fed into the pyrolysis reactor. Here, the hydrocarbons with a reduced acid number are produced at a greater efficiency with respect to overall product yields. The processes described herein do not require the use of a catalyst or hydrogen to produce substantially deoxygenated hydrocarbons, which further contributes to the overall efficiency and reduced costs of the process.

After the short chain free fatty acids have been removed from the hydrocarbons using the techniques described herein, the final hydrocarbon composition has an acid number less than 0.1, less than 0.05, or less 0.02 as measured by ASTM D974, which is essentially 0% fatty acid present in the hydrocarbon composition. Here, the acid number reflects the amount of fatty acid present in the hydrocarbon composition, which includes short chain free fatty acids as well as fatty acids that were not converted to short chain free fatty acids.

EXAMPLES

The following examples are put forth so as to provide those of ordinary skill in the art with a complete disclosure and description of how the materials, articles, and methods described and claimed herein are made and evaluated, and are intended to be purely exemplary and are not intended to limit the scope of what the inventors regard as their invention. Efforts have been made to ensure accuracy with respect to numbers (e.g., amounts, temperature, etc.) but some errors and deviations should be accounted for. Unless indicated otherwise, parts are parts by weight, temperature is in ° C. or is at ambient temperature, and pressure is at or near atmospheric. There are numerous variations and combinations of reaction conditions, e.g., component concentrations, desired solvents, solvent mixtures, temperatures, pressures and other reaction ranges and conditions that can be used to optimize the product purity and yield obtained from the described process. Only reasonable and routine experimentation will be required to optimize such process conditions. Samples used: Pyrolysis products were prepared using the methods described herein and subsequently processed as described below.

Sorbent: Silica gel (Siliaflash® F60 40-63 μm (230-400 mesh), 60 Å pore size) (Silicycle, Quebec city, QC, Canada) and PSA Silica (50 μm, 70 Å pore size) (Supelco, Bellefonte, Pa., USA).

A. Acid Extraction

About 20 g of activated silica gel (heated at 150° C. overnight) or PSA silica was transferred into a glass column that had been plugged with a glass wool to retain the sorbent. The column packing was aided by gently tapping the column several times until the silica gel height in the column remained constant. 50 mL of pyrolysis product was added to the column and gravity eluted. Aliquots of eluted pyrolysis product were collected. Once no visible pyrolysis product layer was observed above the sorbent in the column, compressed air was used to force out as much of the remaining liquid as possible.

Acid Recovery Using Methanol

About 100 mL of HPLC grade methanol (Fisher Scientific, Fair Lawn, N.J., USA) was added to the sorbent in the column and gravity eluted into a round bottom flask until no visible solvent layer was observed about the sorbent. Compressed air was then used to force out as much of the remaining solvent as possible. The methanol was removed by a rotovap under vacuum to recover the acids.

Acids Recovery Using Supercritical Fluid Extraction

A supercritical fluid extraction apparatus was built in-house from Swagelok® tubes and fittings. The used resin from extraction was loaded into the resin reservoir of the apparatus and glass wool was used to plug the ends. Dry ice and/or liquid $CO_2$ was loaded into the $CO_2$ reservoir of the apparatus and then closed tightly. The apparatus was heated at the $CO_2$ reservoir until the temperature and pressure were above the critical point (31° C. and 1100 psi respectively). The $CO_2$ reservoir valve was then fully opened and the resin valve on the apparatus slightly opened to aloe the supercritical $CO_2$ to flow through the resin. The product was then captured into an Erlenmeyer flask of appropriate size to allow the $CO_2$ to evaporate leaving the extract behind.

Analysis

ASTM D974-14 method for acid number determination was used to evaluate changes in acid number with fractions of pyrolysis product collected. GC-MS was then carried out on select samples to determine the identity of compounds retained on the sorbent and recovered from the sorbent.

Results

Table 1 provides the ASTM D974 Acid number of two pyrolysis products (A and B) before (initial) and after extraction with silica gel (fraction). Fraction number indicates the order in which 1.5 mL aliquots were collected.

TABLE 1

| Sorbent | Silica gel A | PSA silica B |
|---|---|---|
| Pyrolysis product | Acid # (mg KOH/g sample) | |
| Initial | 85.2 | 67.4 |
| Fraction 1 | 0.0 | 0.0 |
| Fraction 2 | 0.0 | 0.0 |
| Fraction 3 | 0.0 | 0.0 |
| Fraction 4 | 0.0 | 0.0 |
| Fraction 5 | 0.0 | 0.0 |
| Fraction 6 | 0.0 | 0.0 |
| Fraction 7 | 0.0 | 0.0 |
| Fraction 8 | 0.0 | 0.0 |
| Fraction 9 | 3.6 | 0.0 |
| Fraction 10 | 18.9 | 0.0 |
| Fraction 11 | 38.4 | 0.0 |
| Fraction 12 | 49.3 | 0.0 |
| Fraction 13* | 75.7 | 10.3 |

*Indicates pooled fraction that was forced out using compressed air.
Acid number of 0.0 means acid number is <0.02.

GC-MS chromatograms of several samples before and after acid extraction (i.e., Fraction 1 in Table) are provided in FIGS. 1-5.

The results in Table 1 and in FIGS. 1-5 show that complete extraction of the acids from the pyrolysis products is possible through the use of silica gel or PSA silica sorbents. This is shown in Table 1 where acid numbers decreased to <0.02 and FIGS. 1 and 3 which shows the product before after acids removal through the use the sorbents.

Figure 1:
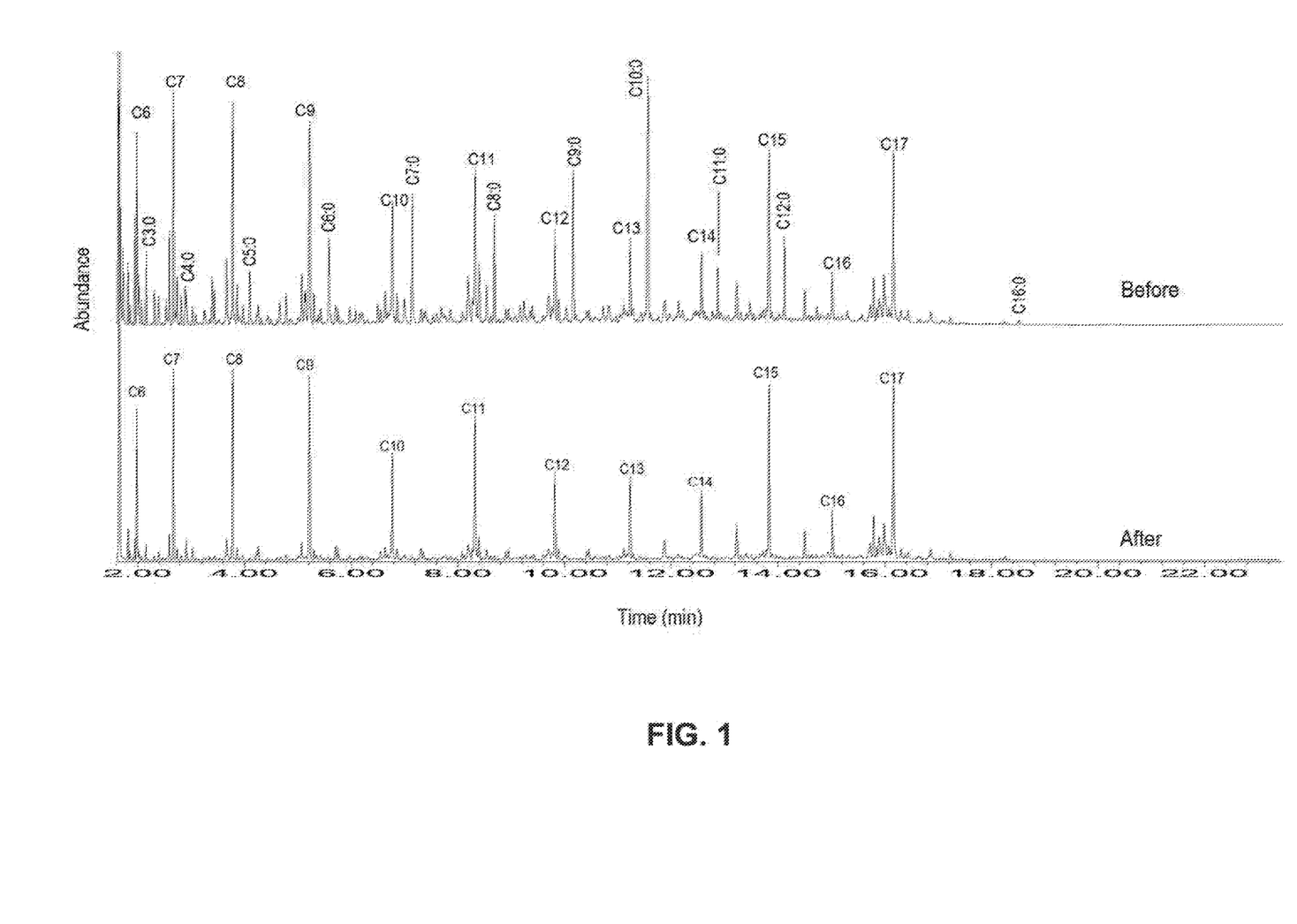
FIG. 1 shows the GC-MS chromatogram of a fatty acid pyrolysis product stream before and after acid extraction.
Figure 2:
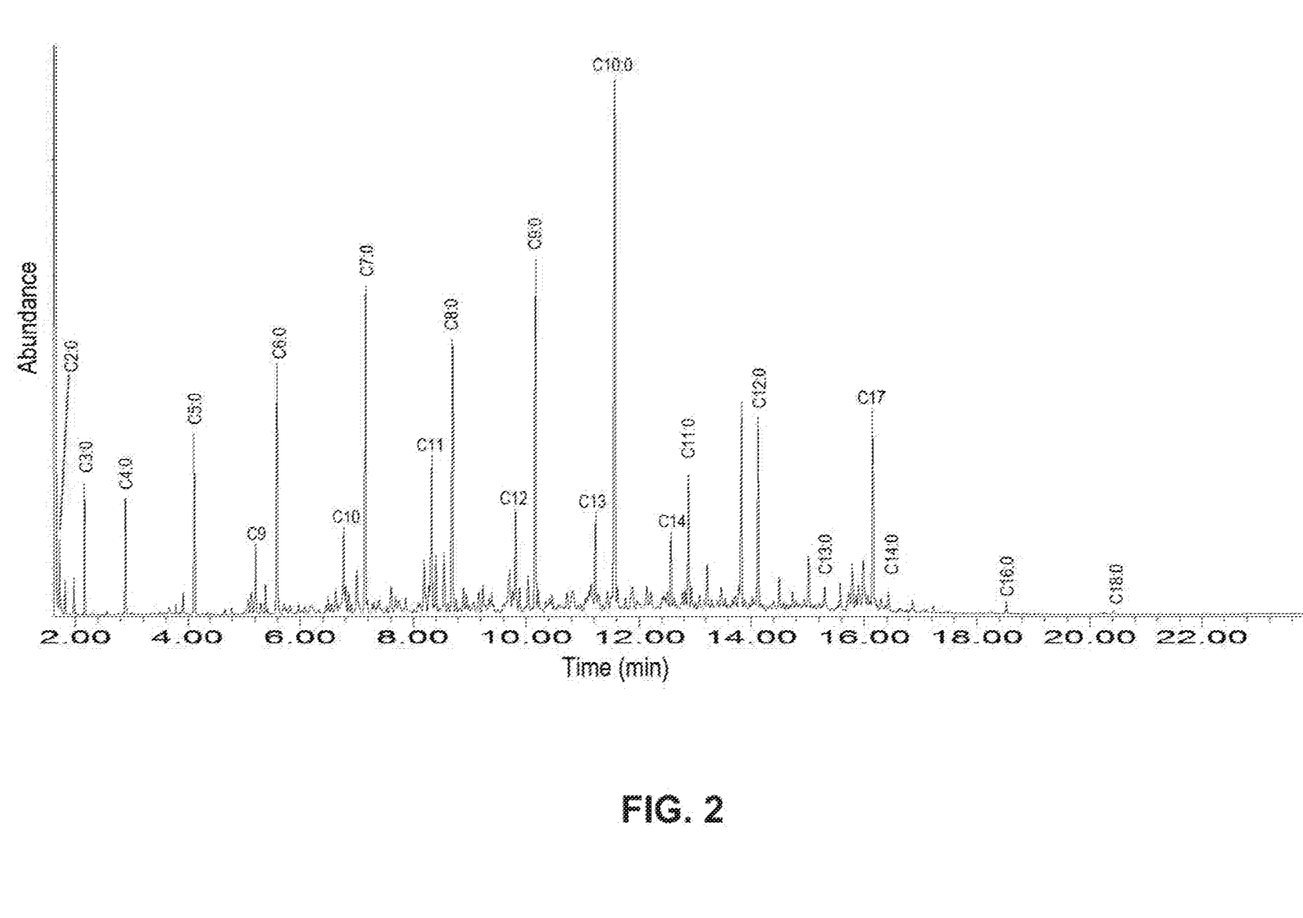
FIG. 2 shows the GC-MS chromatogram of acids separated from the pyrolysis product stream and subsequently recovered from silica by methanol.
Figure 3:
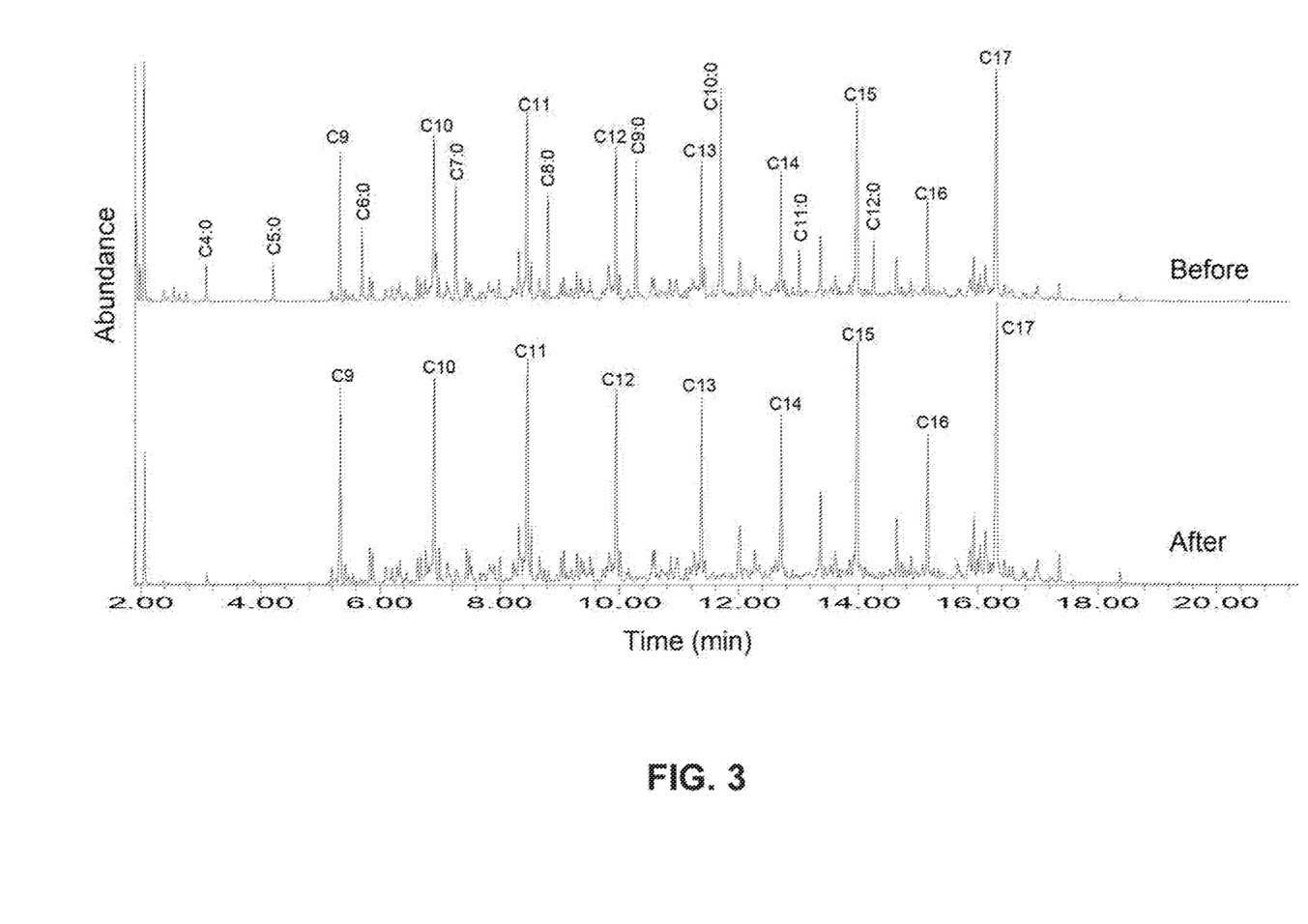
FIG. 3 shows the GC-MS chromatogram of another pyrolysis product stream before and after acid extraction with a functionalized silica.
Figure 4:
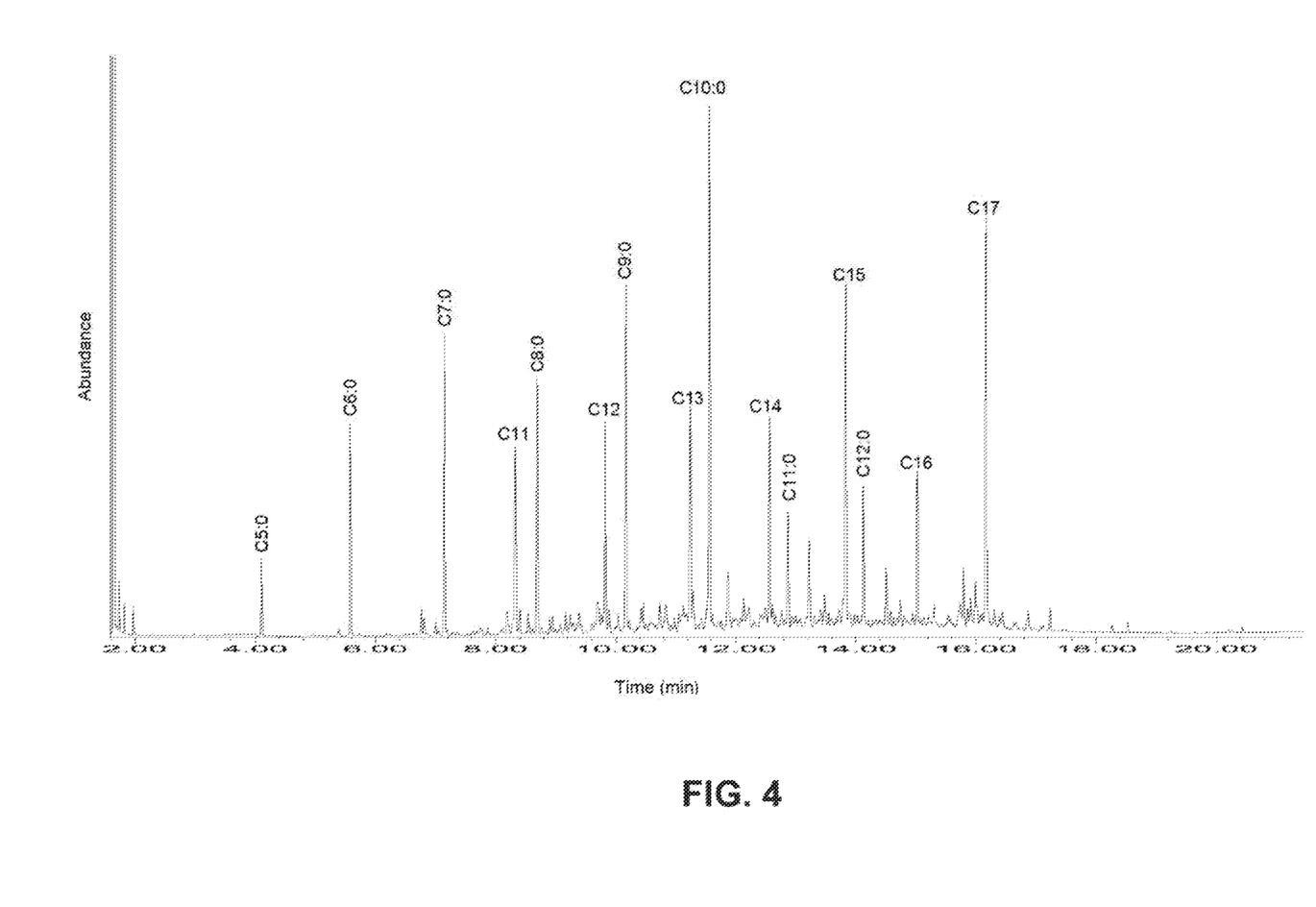
FIG. 4 shows the GC-MS chromatogram of acids separated from the pyrolysis product stream and subsequently recovered from functionalized silica by supercritical $CO_2$.
Figure 5:
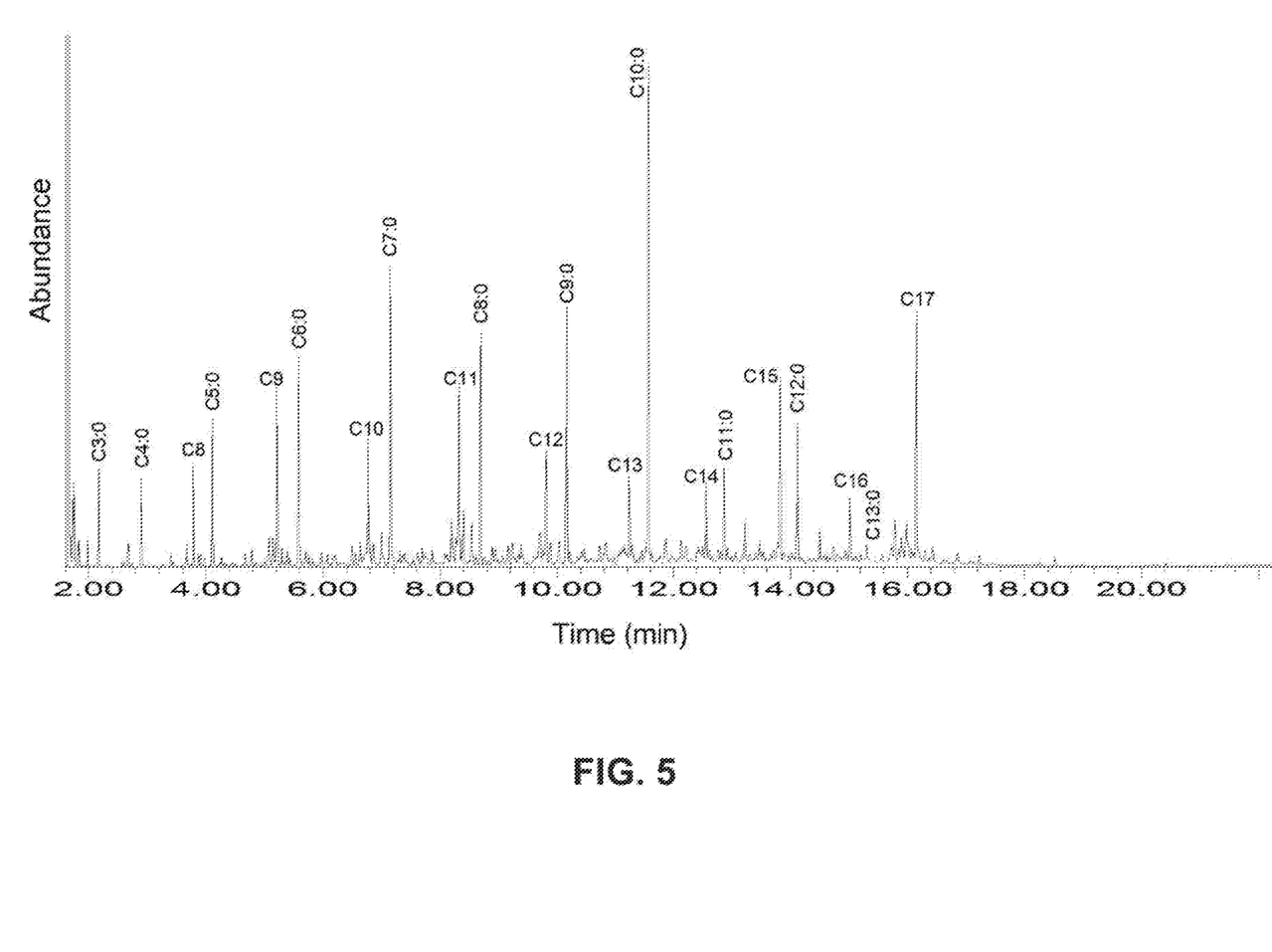
FIG. 5 shows the GC-MS chromatogram of acids present in a lipid pyrolysis product stream and removed from silica by supercritical $CO_2$.

The possibility of recovering the acids after extraction from the pyrolysis product using methanol or supercritical $CO_2$ is also clearly demonstrated (FIGS. 2, 4, and 5). The chromatogram also shows the presence of residual hydrocarbons from C9 and higher, which could be from the residual product used in wetting the column.

B. Base Extraction

Materials

Sample used: Yellow grease hydrolysate pyrolysis product

Caustic solution: 5.9M NaOH solution

Procedure

Approximately 25 mL of cold (sample stored in walk-in fridge) yellow grease hydrolysate pyrolysis product was transferred into a plastic 50 mL centrifuge tube and the tubes were placed in a chest of dry ice. 15 mL and 10 mL of NaOH solution was added a centrifuge tubes vortexed vigorously for about 2 minutes. The tubes were then centrifuged at 8000 rpm for 10 minutes. The supernatant was carefully transferred into a glass vial using a Pasteur pipette. Samples were analyzed for acid number (ASTM D974) and GC-MS was used to determine the species in the before and after samples.

Results

Good phase separation between the organic (pyrolysate) and aqueous fractions was obtained under the conditions tested. The acid number result showed the supernatants had acid number values of 0 compared to the 47.5 mg KOH/g sample in the yellow grease hydrolysate pyrolysis product without acids extraction, which suggests complete extraction of the acids occurred.

The GC-MS chromatogram shows the complete extraction of the acids from the pyrolysis product, confirming the result from the acid number test. The retention of aromatic compounds (low molecular weight compounds such as benzene, toluene, ethylbenzene, xylenes) in the pyrolysate after acid extraction with concentrated NaOH was also observed.

C. Extraction with Ion Exchange Resin

Materials

Sample used: Yellow grease hydrolysate pyrolysis product

Resins: Amberlyst® A21, Dowex® 66, and Amberlite® IRA 67 and Purolite® PD206 (all resins were of the free base Anion exchange form). Samples of Amberlite® IRA 67, Dowex® 66 and Amberlyst® A21 were freeze dried to remove moisture. Purolite® PD206 was received in the dried form and was used as received.

Procedure

Approximately 20 g of dried resin was loaded into a glass column plugged with glass wool. 100 mL of yellow grease hydrolysate pyrolysis product was then added to the column and gravity eluted with 1.5 mL fractions collected. Compressed air was used to force the as much of the liquid out as possible when no visible liquid layer is observed above the resin. Acid number (ASTM D974) was determined on samples. GC-MS was carried on select samples.

Results

The acid number results Table 2 below show that Amberlyst® A21 was able to completely extract/remove all the acids from the pyrolysis product. This was confirmed by GM-MS chromatography. The retention of aromatic compounds (low molecular weight compounds such as benzene, toluene, ethylbenzene, xylenes) in the pyrolysate after extraction

TABLE 2

ASTM D974 Acid number of pyrolysis samples before (initial) and after extraction with Ion exchange resins (fraction). Fraction number indicates the order in which 1.5 mL aliquots were collected.

| Fraction | Amberlite® IRA 67 | Dowex® 66 | Amberlyst® A21 | Purolite® PD206 |
|---|---|---|---|---|
| | Acid number (mg KOH/g) | | | |
| Initial | 48.0 | 48.0 | 48.0 | 48.0 |
| Fraction 1 | 22.4 | 8.5 | 0.0 | 45.6 |
| Fraction 5 | 10.0 | 14.6 | 0.0 | 45.0 |
| Fraction 10 | 8.1 | 3.1 | 0.0 | 45.5 |
| Fraction 15 | 19.8 | 3.2 | 0.0 | 45.3 |
| Fraction 20 | 22.4 | 2.4 | 0.0 | 45.7 |
| Fraction 25 | 20.8 | 1.2 | 0.0 | 46.5 |
| Fraction 30 | 26.5 | 3.5 | 0.0 | 46.1 |
| Fraction 35 | 20.6 | 4.6 | 0.0* | 47.4 |
| Fraction 40 | 20.8 | 6.9 | | 46.4 |
| Fraction 45 | 21.6 | 8.6* | | 47.4 |
| Fraction 50 | 22.9 | | | 47.9 |
| Fraction 51 | 25.8* | | | 48.3* |

*indicates pooled fraction that was forced out using compressed air.
Note:
acid number of 0.0 means acid number is <0.02

Throughout this application, various publications are referenced. The disclosures of these publications in their entireties are hereby incorporated by reference into this application in order to more fully describe the compounds, compositions and methods described herein.

Various modifications and variations can be made to the materials, methods, and articles described herein. Other aspects of the materials, methods, and articles described herein will be apparent from consideration of the specification and practice of the materials, methods, and articles disclosed herein. It is intended that the specification and examples be considered as exemplary.

What is claimed is:

1. A method for producing hydrocarbons from a fatty acid resource, the method comprising
    (a) heating the fatty acid resource such that the fatty acid resource is converted to a product material including a first composition comprising the hydrocarbons and at least one short chain free fatty acid; and
    (b) separating the at least one short chain free fatty acid from the first composition, via one of an adsorption process or an ion exchange process.

2. The method of claim 1, wherein the separating comprises contacting the first composition with an adsorbent.

3. The method of claim 2, wherein the contacting includes passing the first composition through a column comprising the adsorbent.

4. The method of claim 2, wherein the adsorbent comprises silica or modified silica.

5. The method of claim 2, further comprising, after step (b), removing the at least one short chain free fatty acid from the adsorbent.

6. The method of claim 5, wherein the removing includes contacting the adsorbent with a polar solvent.

7. The method of claim 6, wherein the polar solvent comprises an alcohol, a nitrile, an ether, an ester, or a chlorohydrocarbon.

8. The method of claim 5, wherein the removing includes contacting the adsorbent with a supercritical fluid.

9. The method of claim 8, wherein the supercritical fluid is a byproduct from step (a).

10. The method of claim 8, wherein the supercritical fluid comprises carbon monoxide, carbon dioxide, methane, ethane, hydrogen, or any combination thereof.

11. The method of claim 5, wherein the method is continuous.

12. The method of claim 1, wherein the fatty acid resource includes a free fatty acid such that the conversion of the fatty acid resource includes conversion of the free fatty acid, and the product material is obtained in response to the conversion of the free fatty acid, and the separating includes:
    introducing the first composition into a column comprising an adsorbent, such that the short chain free fatty acid is separated from the first composition;
    removing the short chain free fatty acid from the adsorbent; and
    recycling the removed short chain free fatty acid such that the fatty acid resource includes the removed short chain free fatty acid.

13. The method of claim 12, wherein the adsorbent comprises silica or modified silica.

14. The method of claim 13, wherein the adsorbent is contacted with supercritical carbon fluid such that the short chain free fatty acid is removed from the adsorbent.

15. The method of claim 14, wherein the supercritical fluid is a byproduct from step (a).

16. The method of claim 1, wherein the separating comprises contacting the first composition with an anion exchange resin.

17. The method of claim 16, wherein the anion exchange resin comprises a mixture of a polymer and a compound with a plurality of amino groups.

18. The method of claim 16, wherein the anion exchange resin comprises polystyrene and a polymer with a plurality of amino groups.

19. The method of claim 1, wherein the separated short chain fatty acid is removed and heated to produce additional hydrocarbons.

20. The method of claim 1, wherein the fatty acid resource comprises a monoglycerides, a diglyceride, a triglyceride, a lipid, a free fatty acid or salt thereof, or any combination thereof.

21. The method of claim 1, wherein the fatty acid resource comprises vegetable and plant oils, animal fats, algal or fungal oils, tall oils, spent cooking oil, lipids derived from biosolids, lipids, phospholipids, or triglycerides.

22. The method of claim 1, wherein, the fatty acid resource includes a free fatty acid.

23. The method of claim 22, wherein the free fatty acid comprises a saturated fatty acid, an unsaturated fatty acid, or a combination thereof.

24. The method of claim 22, wherein the free fatty acid comprises butyric acid, lauric acid, myristic acid, palmitic acid, stearic acid, arachidic acid, alpha-linolenic acid, docosahexaenoic acid, eicosapentaenoic acid, linoleic acid, arachidonic acid, oleic acid, erucic acid, a naturally derived fatty acid from a plant or animal source, or any combination thereof.

25. The method of claim 1, wherein the heating is conducted at a temperature from 220° C. to 650° C.

26. The method of claim 25, wherein the fatty acid resource includes a free fatty acid.

27. The method of claim 26, wherein the separating, of the at least one short chain free fatty acid from the first composition, includes contacting the first composition with an adsorbent.

28. The method of claim 1, wherein the heating is conducted at a temperature from 250° C. to 500° C. and for a duration of two seconds up to 8 hours.

29. The method of claim 1, wherein the heating is conducted in the presence of one or more alkenes.

30. The method of claim 1, wherein the heating is conducted in the absence of supplemental hydrogen.

* * * * *